US012662613B2

(12) United States Patent
Shi et al.

(10) Patent No.: US 12,662,613 B2
(45) Date of Patent: Jun. 23, 2026

(54) ADHESIVE COMPOSITION WITH IMPROVED BONDING STRENGTH AND HEAT SEAL PERFORMANCE

(71) Applicants: Dow Global Technologies LLC, Midland, MI (US); Rohm and Haas Company, Collegeville, PA (US)

(72) Inventors: Rui Shi, Shanghai (CN); Weifang Zhang, Shanghai (CN); Yin Xue, Shanghai (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 328 days.

(21) Appl. No.: 18/276,979

(22) PCT Filed: Feb. 25, 2021

(86) PCT No.: PCT/CN2021/077824

§ 371 (c)(1),
(2) Date: Aug. 11, 2023

(87) PCT Pub. No.: WO2022/178745

PCT Pub. Date: Sep. 1, 2022

(65) Prior Publication Data

US 2024/0132759 A1 Apr. 25, 2024

(51) Int. Cl.
*C09J 133/08* (2006.01)

(52) U.S. Cl.
CPC .................................. *C09J 133/08* (2013.01)

(58) Field of Classification Search
CPC . C09J 133/08; C09J 133/064; B32B 2255/10; B32B 15/085; B32B 2250/02; B32B 2255/26; B32B 2307/31; B32B 2307/718; B32B 2439/70; B32B 7/12; B32B 27/08; B32B 27/32; B32B 27/36; C08F 220/1804; C08F 222/08; C08F 212/08; C08F 220/06; C08L 35/06
See application file for complete search history.

(56) References Cited

U.S. PATENT DOCUMENTS

| | | | | |
|---|---|---|---|---|
| 3,444,151 | A | 5/1969 | Verdol et al. | |
| 6,376,094 | B1 * | 4/2002 | Dames | B32B 7/12 428/514 |
| 9,605,117 | B2 | 3/2017 | Qu et al. | |
| 10,876,256 | B2 | 12/2020 | Luyten et al. | |
| 2018/0072928 | A1 | 3/2018 | Chatterjee et al. | |
| 2020/0123425 | A1 | 4/2020 | Chen et al. | |

FOREIGN PATENT DOCUMENTS

| | | | |
|---|---|---|---|
| CN | 102775944 | A | 11/2012 |
| EP | 2682523 | | 1/2014 |
| JP | 2000109045 | | 4/2000 |
| JP | 2004155448 | | 6/2004 |
| JP | 2006-160773 | A | 6/2006 |
| JP | 2006-316085 | A | 11/2006 |
| JP | 2008-038042 | A | 2/2008 |
| JP | 2020-015904 | A | 1/2020 |
| WO | 2003006511 | | 1/2003 |
| WO | 2004003029 | | 1/2004 |
| WO | 2013/117428 | A1 | 8/2013 |
| WO | 2018/019919 | A1 | 2/2018 |

OTHER PUBLICATIONS

JP2008038042A Machine Translation of Description (Year: 2025).*
Brandrup, "Polymer Handbook", Interscience Publishers, 1990, pp. 277-280.
Fox, Bull. Am. Physics Soc., 1956, vol. 1, No. 3, p. 123.
Anonymous; "Adhesives—SMA copolymers: adhesion improvement, hydrophobicity;" Jan. 1, 2019; pp. 1-6; XP055831513.

* cited by examiner

*Primary Examiner* — Cynthia L Schaller
(74) *Attorney, Agent, or Firm* — Boyle Fredrickson S.C.

(57) ABSTRACT

An adhesive composition comprising: (A) an acrylic emulsion polymer; and (B) a vinyl aromatic monomer-maleic anhydride copolymer is provided, wherein (B) vinyl aromatic monomer-maleic anhydride copolymer is present at an amount of 0.1% by weight to 6.5% by weight, based on the total solid weight of the adhesive composition. The adhesive composition provides improved performances in terms of bonding strength and/or heat seal performance.

9 Claims, No Drawings

ADHESIVE COMPOSITION WITH IMPROVED BONDING STRENGTH AND HEAT SEAL PERFORMANCE

FIELD OF THE DISCLOSURE

The present disclosure relates to an adhesive composition. More particularly, the present disclosure relates to an adhesive composition, an article comprising the same and a method of producing the article. The adhesive composition provides improved performances in terms of bonding strength and/or heat seal performance.

BACKGROUND

Adhesive compositions are useful for a wide variety of purposes. For instance, adhesive compositions are used to bond together substrates such as polyethylenes, polypropylenes, polyesters, polyamides, metals, papers, or cellophanes to form composite films, i.e., laminates. The use of adhesives in different laminating end-use applications is generally known. For example, adhesives can be used in the manufacture of film/film and film/foil laminates used in the packaging industry, especially for food packaging. Adhesives used in laminating applications, or "laminating adhesives," can be generally placed into three categories: solvent-based, water-based, and solventless.

Many water based laminating adhesives have been developed for film/film(foil) lamination for a couple of years. However, water based laminating adhesive is also limited by performance disadvantages for a broader application. The water-based laminating adhesives in the prior art tend to exhibit low bonding strength for foil based lamination structure and/or poor heat seal performance. It is therefore desirable to develop an adhesive composition with improved performances in terms of bonding strength and/or heat seal performance.

SUMMARY OF THE DISCLOSURE

In an aspect, the present disclosure provides an adhesive composition, comprising:

(A) an acrylic emulsion polymer; and (B) a vinyl aromatic monomer-maleic anhydride copolymer wherein (B) vinyl aromatic monomer-maleic anhydride copolymer is present at an amount of 0.1% by weight to 6.5% by weight, based on the total solid weight of the adhesive composition.

In a further aspect, the present disclosure provides a method of producing a laminate using the described adhesive composition, comprising:

(a) providing the adhesive composition as described above;

(b) applying the adhesive composition on a first portion of a surface of a substrate to form a layer of the adhesive composition;

(d) bringing a second portion of a surface of a substrate into contact with the layer of the adhesive composition, so that the layer of the adhesive composition is sandwiched between the first portion and the second portion; and (e) drying the adhesive composition or allowing it to dry.

In a further aspect, the present disclosure provides a laminate prepared by using the method of producing a laminate as described herein.

In a further aspect, the present disclosure provides a laminate comprising a first portion of a surface of a substrate, a layer of a adhesive composition as described herein, and a second portion of a surface of the same or a different substrate, wherein the layer of the adhesive composition is sandwiched between and in contact with the first portion and the second portion.

In a further aspect, the present disclosure provides a use of a vinyl aromatic monomer-maleic anhydride copolymer for improving the bonding strength and/or heat seal performance of an adhesive composition comprising an acrylic emulsion polymer. Preferably, the vinyl aromatic monomer-maleic anhydride copolymer is present at an amount of 0.1% by weight to 6% by weight, based on the total solid weight of the adhesive composition.

DETAILED DESCRIPTION OF THE INVENTION

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

As disclosed herein, "and/or" means "and, or as an alternative". All ranges include endpoints unless otherwise indicated.

As disclosed herein, all percentages mentioned herein are by weight, and temperatures in ° C., unless specified otherwise.

"Aqueous" composition or dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, or mixtures thereof.

"Glass transition temperature" or "Tg" as used herein can be measured by various techniques including, for example, differential scanning calorimetry ("DSC") or calculation by using a Fox equation. The particular values of $T_g$ reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$, all temperatures being in K. The glass transition temperatures of the homopolymers may be found, for example, in "Polymer Handbook", edited by J. Brandrup and E. H. Immergut, Interscience Publishers.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

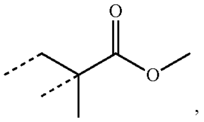

where the dotted lines represent the points of attachment of the structural unit to the polymer backbone.

Adhesive Composition

The adhesive composition according to the present disclosure comprises (A) an acrylic emulsion polymer; and (B) a vinyl aromatic monomer-maleic anhydride copolymer, wherein (B) vinyl aromatic monomer-maleic anhydride copolymer is present at an amount of 0.1% by weight to 6.5% by weight, based on the total solid weight of the adhesive composition.

The adhesive composition is preferably water-based.

More preferably, the adhesive composition is a one-component water based adhesive composition.

The Acrylic Emulsion Polymer

The acrylic emulsion polymer of the present invention may comprise (a) structural units of one or more ethylenically unsaturated ionic monomer. The term "ionic monomer" herein refers to a monomer that bears an ionic charge between pH=1-14. Examples of suitable ethylenically unsaturated ionic monomers include a, β-ethylenically unsaturated carboxylic acids including an acid-bearing monomer such as methacrylic acid, acrylic acid, itaconic acid, maleic acid, or fumaric acid; sodium styrene sulfonate (SSS), sodium vinyl sulfonate (SVS), 2-acrylamido-2-methylpropanesulfonic acid (AMPS), sodium salt of 2-acrylamido-2-methyl-1-propanesulfonic acid, ammonium salt of 2-acrylamido-2-methyl-1-propane sulfonic acid; sodium salt of allyl ether sulfonate; phosphoalkyl (meth)acrylates such as phosphoethyl (meth)acrylate, phosphopropyl (meth)acrylate, phosphobutyl (meth)acrylate, salts thereof, and mixtures thereof; $CH_2=C(R_{p1})-C(O)-O-(R_{p2}O)_p-P(O)(OH)_2$, wherein $R_{p1}=H$ or $CH_3$, $R_{p2}$=alkyl and p=1-10, such as SIPOMER PAM-100, SIPOMER PAM-200, and SIPOMER PAM-300 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, allyl ether phosphate, vinyl phosphonic acid, salts thereof, or mixtures thereof. Preferred ethylenically unsaturated ionic monomers are phosphoethyl methacrylate (PEM), acrylic acid (AA), methacrylic acid (MAA), or mixtures thereof. The acrylic emulsion polymer of the present invention may comprise, by weight based on the weight of the emulsion polymer, 0.1% or more, 0.3% or more, 0.5% or more, 0.75% or more, or even 1% or more, and at the same time, 8% or less, 7% or less, 6% or less, 5% or less, 4.5% or less, 4% or less, 3.8% or less, 3.5% or less, or even 3.3% or less of structural units of the ethylenically unsaturated ionic monomer.

The acrylic emulsion polymer of the present invention may comprise (b) structural units of one or more ethylenically unsaturated nonionic monomer, which can be a monoethylenically or multiethylenically unsaturated monomer. The term "nonionic monomer" herein refers to a monomer that does not bear an ionic charge between pH=1-14. Suitable monoethylenically unsaturated nonionic monomers may include, for example, vinyl aromatic monomers, $C_1$-$C_{20}$-alkyl (meth)acrylates, acrylonitrile (AN), (meth) acrylamide, or mixtures thereof. The $C_1$-$C_{20}$-alkyl (meth) acrylates refer to alkyl esters of (meth)acrylic acid containing an alkyl with from 1 to 20 carbon atoms. The $C_1$-$C_{20}$-alkyl (meth)acrylates may include $C_1$-$C_3$-alkyl (meth) acrylates, cycloalkyl (meth)acrylates, and $C_4$-$C_{20}$-alkyl (meth)acrylates that are different from the cycloalkyl (meth) acrylate. Examples of suitable alkyl (meth)acrylates include methyl (meth)acrylate, ethyl (meth)acrylate, butyl (meth) acrylate, iso-butyl (meth)acrylate, 2-ethylhexyl (meth)acrylate, lauryl (meth)acrylate, stearyl (meth)acrylate; cycloalkyl (meth)acrylates such as cyclohexyl (meth)acrylate, methcyclohexyl (meth)acrylate, dihydrodicyclopentadienyl (meth)acrylate, trimethylcyclohexyl (meth)acrylate, and t-butyl (meth)cyclohexyl acrylate; hydroxy-functional (meth)acrylic acid alkyl ester such as hydroxyethyl methacrylate and hydroxypropyl methacrylate; glycidyl (meth) acrylate; or mixtures thereof. The vinyl aromatic monomer may include styrene, substituted styrene such as alpha-methylstyrene, trans-beta-methylstyrene, 2,4-dimethylstyrene, ethylstyrene, butylstryene, and p-methoxystyrene; o-, m-, and p-methoxystyrene; and p-trifluoromethylstyrene; or mixtures thereof. Preferred monoethylenically unsaturated nonionic monomers include methyl methacrylate, styrene, cyclohexyl methacrylate, 2-ethylhexyl acrylate, butyl acrylate, or mixtures thereof. Preferred monoethylenically unsaturated nonionic monomers include methyl methacrylate, methyl acrylate, styrene, butyl methacrylate, butyl acrylate, or mixtures thereof. The content of structural units of the ethylenically unsaturated nonionic monomer may be adjusted to give the resultant emulsion polymer with desired Hansen solubility parameters. For example, the emulsion polymer may comprise, by weight based on the weight of the emulsion polymer, structural units of butyl acrylate preferably in an amount of 35% or more, 36% or more, or even 37% or more, and at the same time, 45% or less, 44% or less, or even 43% or less; and structural units of styrene in an amount of 30% or more, 31% or more, 32% or more, 33% or more, or even 34% or more, and the same time, 50% or less, 49% or less, 48% or less, 46% or less, or even 45% or less. Alternatively, the emulsion polymer may comprise, by weight based on the weight of the emulsion polymer, structural units of 2-ethylhexyl acrylate preferably in an amount of 30% or more, 31% or more, or even 32% or more, and at the same time, 40% or less, 39% or less, or even 38% or less; and structural units of styrene in an amount of 30% or more, 31% or more, 32% or more, 33% or more, or even 34% or more, and at the same time, 39.5% or less, 39% or less, 38% or less, or even 37% or less. The emulsion polymer may comprise, by weight based on the weight of the emulsion polymer, less than 19% of structural units of acrylonitrile, for example, less than 15%, less than 10%, less than 5%, less than 1%, or even zero of structural units of acrylonitrile. Multiethylenically unsaturated nonionic monomers useful in the present invention include di-, tri-, tetra-, or higher multifunctional ethylenically unsaturated monomers. Suitable multiethylenically unsaturated monomers may include, for example, allyl (meth)acrylate, divinyl benzene, ethylene glycol dimethacrylate, butylene glycol dimethacrylate, or mixtures thereof. The emulsion polymer may comprise, by weight based on the weight of the emulsion polymer, from zero to 3.0%, from 0.05% to 0.8%, or from 0.1% to 0.5% of structural units of the multiethylenically unsaturated nonionic monomer.

The acrylic emulsion polymer comprises, by weight based on the weight of the emulsion polymer, from 30% to 50% of structural units of vinyl aromatic monomers, from 50% to 70% of structural units of $C_1$-$C_{20}$-alkyl (meth)acrylates, and from 0.1% to 8% of structural units of (meth)acrylic acid.

Alternatively, the acrylic emulsion polymer comprises, by weight based on the weight of the emulsion polymer, from 30% to 50% of structural units of styrene, from 50% to 70% of structural units of butyl acrylate, and from 0.1% to 8% of structural units of acrylic acid.

Total concentration of structural units in the acrylic emulsion polymer is equal to 100%. Types and levels of the monomers described above may be chosen to provide the emulsion polymer with a glass transition temperature ($T_g$) suitable for different applications. The acrylic emulsion polymer may have a $T_g$ in the range of from −20 to 60° C., from −15 to 50° C., from −10 to 30° C., or from −5 to 20° C. The $T_g$ values of the emulsion polymer can be measured by various techniques including differential scanning calorimetry (DSC) or calculated by using the Fox equation.

The acrylic emulsion polymer useful in the present invention may be prepared by free-radical polymerization, preferably emulsion polymerization, of the monomers described above. Total weight concentration of the monomers used for preparing the acrylic copolymer is equal to 100%. The monomers may be added neat or as an emulsion in water; or added in one or more additions or continuously, linearly or nonlinearly, over the reaction period of preparing the acrylic copolymer. Temperature suitable for polymerization process may be lower than 100° C., in the range of from 30 to 95° C., or in the range of from 50 to 90° C.

In the process of preparing the emulsion polymer, free radical initiators may be used. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof potassium permanganate, and ammonium or alkali metal salts of peroxydisulfuric acid. The free radical initiators may be used typically at a level of 0.01 to 3.0% by weight, based on the total weight of monomers used for preparing the emulsion polymer. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the process of preparing the emulsion polymer, a chain transfer agent may be used. Examples of suitable chain transfer agents include 3-mercaptopropionic acid, methyl mercaptopropionate, butyl mercaptopropionate, n-dodecyl mercaptan, benzenethiol, azelaic alkyl mercaptan, or mixtures thereof. The chain transfer agent may be used in an effective amount to control the molecular weight of the emulsion polymer. The chain transfer agent may be present in an amount of from zero to 3%, from 0.01% to 1%, or from 0.1% to 0.3%, by weight based on the total weight of monomers used for preparing the emulsion polymer.

In the process of preparing the emulsion polymer, a surfactant may be used. Surfactants may be added prior to, during, or after the polymerization of the monomers, or combinations thereof. Examples of suitable additional surfactants include alkali metal or ammonium salts of alkyl, aryl, or alkylaryl sulfates, sulfonates or phosphates; alkyl sulfonic acids; sulfosuccinate salts; fatty acids; polymerizable surfactants; ethoxylated alcohols or phenols; and mixtures thereof. The additional surfactant should be used in an amount without compromising performance of the aqueous polymer dispersion, for example, from zero to 1.5%, from 0.1% to 1%, from 0.2% to 0.8%, or from 0.3% to 0.6%, by weight based on the dry weight of the emulsion polymer.

The pH value of the obtained aqueous emulsion polymer dispersion may be controlled to be at least 5, for example, from 6 to 10 or from 6.5 to 9, by neutralization. Neutralization may be conducted by adding one or more bases which may lead to partial or complete neutralization of the ionic or latently ionic groups of the multistage polymeric particles. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-n-propylamine, tributylamine, triethanolamine, dimethoxyethylamine, 2-ethoxyethylamine, 3-ethoxypropyl amine, dimethylethanolamine, diisopropanolamine, morpholine, ethylenediamine, 2-di ethyl aminoethyl amine, 2,3-di aminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The emulsion polymer useful in the present invention may have a particle size of from 50 nanometers (nm) to 500 nm, from 80 nm to 200 nm, or from 90 nm to 150 nm. The particle size herein refers to Z-average size and may be measured by a Brookhaven BI-90 Plus Particle Size Analyzer.

Vinyl Aromatic Monomer-Maleic Anhydride Copolymer

The vinyl aromatic monomer-maleic anhydride copolymer of the present disclosure may comprise (a) structural units of one or more vinyl aromatic monomers. The vinyl aromatic monomer may include styrene, substituted styrene such as alpha-methylstyrene, trans-beta-methylstyrene, 2,4-dimethylstyrene, ethylstyrene, butylstryene, and p-methoxystyrene; o-, m-, and p-methoxystyrene; and p-trifluoromethylstyrene; or mixtures thereof. The vinyl aromatic monomer-maleic anhydride copolymer of the present invention may comprise, by weight based on the weight of the vinyl aromatic monomer-maleic anhydride copolymer, 20% or more, 30% or more, or even 40% or more, and at the same time, 99% or less, 90% or less, 80% or less, 70% or less, or even 60% or less of structural units of the vinyl aromatic monomer.

The vinyl aromatic monomer-maleic anhydride copolymer of the present disclosure may comprise (b) structural units of maleic anhydride. The vinyl aromatic monomer-maleic anhydride copolymer of the present invention may comprise, by weight based on the weight of the vinyl aromatic monomer-maleic anhydride copolymer, 5% or more, 10% or more, 20% or more, 30% or more, or even 40% or more, and at the same time, 80% or less, 70% or less, or even 60% or less of structural units of maleic anhydride.

The vinyl aromatic monomer-maleic anhydride copolymer of the present disclosure may be imidized by an amine, such as ammonia or dimethylpropylene diamine. The degree of imidization of the copolymer can be between 50 and 100%. These imidized vinyl aromatic monomer-maleic anhydride copolymer are also commercially available from the company Cray Valley under the names SMA X10000i, SMA X2000i, SMA X3000i, SMA X4000i, and SMA 3000H.

The preferred vinyl aromatic monomer-maleic anhydride copolymer of the invention is a copolymer of styrene and maleic anhydride (SMA). Preferably, the ratio of styrene to maleic anhydride of 1/1 to 6/1, preferably of 2/1 to 4/1.

The number molecular weight of the vinyl aromatic monomer-maleic anhydride copolymer is between 500 and 20,000, preferably between 2,000 and 5,000.

The vinyl aromatic monomer-maleic anhydride copolymer can be prepared by any known method, for example, according to the method described in U.S. Pat. No. 3,444, 151 A.

The vinyl aromatic monomer-maleic anhydride copolymer (B) is present at an amount of 0.1% by weight or more, 0.5% by weight or more, 0.8% by weight or more, 1.0% by weight or more, 1.2% by weight or more, 1.5% by weight or more, and at the same time, 6.5% by weight or less, 6.0% by weight or less, or 5.5% by weight or less, 5.0% by weight or less, 4.5% by weight or less, based on the total solid weight of the adhesive composition.

Optional Components

The adhesive composition according to the present disclosure may optionally comprise one or more components selected from the group consisting of isocyanate cross-linkers, rheology modifiers, defoamers, silanes, and other additives.

Isocyanate Crosslinker(s)

The adhesive composition according to the present disclosure may optionally comprise an isocyanate crosslinker. The isocyanate crosslinker includes isocyanate monomer, polyisocyanate, isocyanate adduct and the mixture thereof, or carbodiimide.

In the adhesive composition of the present disclosure, the isocyanate crosslinker(s) may be present, based on the total solid weight of the adhesive composition, in an amount of 0.1-20% by weight, preferably, 1-15% by weight, more preferably, 1-8% by weight, and still more preferably, 3-7% by weight.

Rheology Modifiers

The adhesive composition according to the present disclosure may further comprise a rheology modifier. The rheology modifier may include, not limited to, a non-ionic urethane polymer, cellulose, cellulose ether, polyethylene glycol, starch ether, polyvinyl alcohol, polyimide, gum, flour and mixtures thereof. The rheology modifier was preferably chosen from non-associate thickener, such as cellulose ether.

The rheology modifier may be present, based on the total solid weight of the adhesive composition, in an amount of generally from 0.1 to 5.0% by weight, from 0.2% to 3% by weight, or from 0.5% to 2.0% by weight, or from 0.4% to 1.0% by weight.

Defoamers

The adhesive composition according to the present disclosure may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, or mixtures thereof. Suitable commercially available defoamers include, for example, TEGO Airex 902 W and TEGO Foamex 1488 polyether siloxane copolymer emulsions both available from TEGO, BYK-024 silicone deformer available from BYK, NOPCO NXZ deformer available from NOPCO or mixtures thereof. The defoamer may be present, by weight of the total solid of the adhesive composition, in an amount of generally from 0.01 to 2%, from 0.02% to 1.5%, or from 0.04% to 0.5%, or from 0.04% to 0.1%.

Silanes

For some applications, an adhesive composition having a high viscosity (e. g. >20, 000 cP) and high solid content (e. g. >70%) is required. In these cases, to offer enough pot-life, loading of NCO cross-linker will be restricted, and silane was used as additive to compensate for NCO cross-linker, thus delivering both sufficient pot-life and adhesion performance. The silane according to the present disclosure may be epoxy-functional silane.

The epoxy functional silane compound useful in the present invention is typically a saturated alkoxylated silane having an epoxy group. The epoxy functional silane compound may have at least one hydrolysable silane group. A preferred epoxy functional silane compound has the general formula (I):

(I)

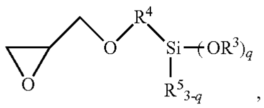

, where each $R^3$ independently represents an alkyl group having one to 6 carbon atoms; each $OR^3$ group independently represents an alkoxy group having one to 6 carbon atoms including, for example, methoxy, ethoxy, or a combination thereof; $R^4$ represents a bivalent organic group having a molecular weight of 200 or less, preferably, $R^4$ is a $C_1$-$C_{10}$, $C_1$-$C_5$, or $C_1$-$C_3$ alkylene group; $R^5$ represents a hydrogen atom or an alkyl, aryl, or aralkyl group having one to 20 carbon atoms; and q is one, 2 or 3. Examples of suitable epoxy functional silane compounds include 3-glycidyloxypropyl trimethoxysilane, 3-glycidyloxypropyl triethoxysilane, 3-glycidyloxypropyl methyldiethoxysilane, 3-glycidyloxypropyl methyldimethoxysilane, or mixtures thereof. Commercially available epoxy functional silane compounds may include Silquest A-187 gamma-glycidoxypropyltrimethoxysilane from Momentive Performance Materials Inc.

The epoxy functional silanes useful in the present disclosure may be present in a combined amount of zero or more, 0.05% or more, 0.1% or more, 0.15% or more, 0.2% or more, 0.25% or more, 0.3% or more, or even 0.35% or more, and at the same time, 5% or less, 4% or less, 3% or less, 2.5% or less, 2% or less, 1.5% or less, 1.2% or less, 1% or less, 0.8% or less, or even 0.5% or less, by weight of the total solid of the adhesive composition.

Other Additives

In addition to the components described above, the adhesive composition of the present invention may further comprise any one or combination of the following additives: dispersants, buffers, neutralizers, humectants, mildewcides, biocides, colorants, flowing agents, anti-oxidants, plasticizers, leveling agents, thixotropic agents, adhesion promoters, and grind vehicles. When present, these additives may be present in a combined amount of from 0 to 5% by weight or from 0.1% to 3% by weight, or from 0.5 to 1.5% by weight, based on the total solid weight of the adhesive composition.

The adhesive composition of the present invention may be prepared with techniques known in the adhesive art, including admixing the acrylic emulsion polymer with the vinyl aromatic monomer-maleic anhydride copolymer and other optional components as described above. Components in the adhesive composition may be mixed in any order to provide the adhesive composition of the present invention. Any of the above-mentioned optional components may also be added to the composition during or prior to the mixing to form the adhesive composition.

The present disclosure also provides a method of producing a laminate using the adhesive composition as described herein, comprising:

(a) providing the adhesive composition as described above;

(b) applying the adhesive composition on a first portion of a surface of a substrate to form a layer of the adhesive composition;

(c) bringing a second portion of a surface of a substrate into contact with the layer of the adhesive composition, so that the layer of the adhesive composition is sandwiched between the first portion and the second portion; and (d) drying the adhesive composition or allowing it to dry.

In some embodiments, the method can comprise applying the adhesive composition on a first portion of a surface of a substrate (for example, a film) to form a layer of the adhesive composition. As used herein, "the first portion of a surface of a substrate" can refer to a part of or the whole surface. In some embodiments, the first portion of a surface can be a part of the surface or the whole surface. In some embodiments, the coating weight of the adhesive composition can be from 0.5 to 5.0 $g/m^2$, from 0.5 to 4.0 $g/m^2$, from 0.5 to 3.0 $g/m^2$, from 0.5 to 2.0 $g/m^2$, from 0.5 to 1.0 $g/m^2$, from 0.8 to 4.0 $g/m^2$, from 0.8 to 3.0 $g/m^2$, from 1.0 to 3.0 $g/m^2$, from 1.5 to 3.0 $g/m^2$, or from 1.5 to 2.0 $g/m^2$. In some embodiments, the substrate can be made of materials selected from the group consisting of polyethylenes, polypropylenes, polyesters, polyamides, metals, papers, cellophanes and combinations thereof. In some embodiments, the substrate can be in the form of a film.

A "film" can refer to a layer of material having a thickness of 0.5 mm or less. In some embodiments, a film can be a structure that is 0.5 mm or less in one dimension and is 1 cm or more in both of the other two dimensions. In some embodiments, a polymer film is a film that is made of a polymer or mixture of polymers. In some embodiments, the thickness of the layer of the adhesive composition applied to the film is 1 to 5 μm. Suitable films include paper, woven and nonwoven fabric, metal foil, polymers, and metal-coated polymers. Films optionally have a surface on which an image is printed with ink; the ink may be in contact with the adhesive composition. In some embodiments, the films are polymer films and metal-coated polymer films, more preferred are polymer films. The polymer films can be PE or PET films.

In some embodiments, the method can comprise bringing a second portion of a surface of a substrate (for example, a film) into contact with the layer of the adhesive composition, so that the layer of the adhesive composition is sandwiched between the first portion and the second portion to form a laminate. As used herein, "a second portion of a surface of a substrate" can refer to a part of or the whole surface. Generally, the second portion is different from the first portion as described above. In some embodiment, the first and second portions can be portions on the same or different surfaces. In some embodiments, the first and second portions can be portions of the same or different surfaces of the same or different substrates. In some embodiments, the first portion of a surface can be part of the surface or the whole surface. In some embodiments, the second portion of a surface can be a part of the surface or the whole surface.

In some embodiments, the method can comprise drying the adhesive composition or allowing it to dry. In some embodiments, the laminate may be subjected to pressure, for example, by passing through nip rollers, which may or may not be heated. In some embodiments, the laminate may be heated (for example, at a temperature of from 30° C. to 90° C., for example, from 30° C. to 60° C.) to speed the drying process.

In a further aspect, the present disclosure provides a laminate, which is prepared by using the method of producing a cured laminate as described herein.

In a further aspect, the present disclosure provides a laminate comprising a first portion of a surface of a substrate, a layer of a adhesive composition as described herein, and a second portion of a surface of the same or a different substrate, wherein the layer of the adhesive composition is sandwiched between and in contact with the first portion and the second portion.

Examples

Some embodiments of the invention will now be described in the following Examples, wherein all parts and percentages are by weight unless otherwise specified. However, the scope of the present disclosure is not, of course, limited to the formulations set forth in these examples. Rather, the Examples are merely inventive of the disclosure.

1. Raw Materials

The information of the raw materials used in the examples is listed in the following Table 1.

TABLE 1

| Raw Materials | | |
|---|---|---|
| Raw Material | Description | Supplier |
| ROBOND ™L-80D | Butyl Acrylate/Styrene/Acrylic Acid copolymer, Solids = 45% | Dow |
| SMA-3000H | Styrene/maleic anhydride copolymer dispersion, 15% solids content, PH value around 8-9, Mn = 3800 | Cray Valley S.A. |

2. Preparation Procedure:

The samples were prepared according to the formulation listed in Table 2. ROBOND™ L-80D and SMA-3000H were weighed and mixed carefully in a glass reactor, which was then put in a water bath of 25° C. A rotator was turned on and the rotation speed was controlled at 50RM and the whole process was monitored. After 0.5 hours, the product was charged to 100 ml HDPE bottle.

TABLE 2

| Adhesive Composition Formulations | | | |
|---|---|---|---|
| Sample Code | ROBOND ™ L-80D (G) | SMA-3000H (G) | SMA-3000H Solid content (%) |
| C-1 | 100 | 0 | 0 |
| I-1 | 100 | 2 | 0.71% |
| I-2 | 100 | 5 | 1.75% |
| I-3 | 100 | 10 | 3.45% |
| I-4 | 100 | 15 | 5.08% |
| C-2 | 100 | 20 | 6.67% |

Notes:
SMA-3000H (%) measured by the dry weight of SMA-3000H based on the total solid weight of the adhesive composition.

3. Coating and Laminating Process:

Coating and lamination process was conducted in SDC Labo-Combi 400 machine. The lamination speed was kept at 100 m/min speed during the whole lamination process. Coating weight was 1.8-2.0 g/$m^2$. Then the laminated film was cured at room temperature (23-25° C.) or in oven before testing.

4. Test Method:

T-Peel(90°) Bonding Strength (Hand Assisted T-Peel)

After drying, the laminated films were cut into 15 mm width strips for T-peel testing in Instron 5943 machine with 250 mm/min crosshead speed. Three strips were tested to take the average value. During the testing, the tail of the strip was pulled slightly by fingers to make sure the tail remained 90° degree to the peeling direction.

Heat Seal Strength:

The laminates were heat-sealed in a HSG-C Heat-Sealing Machine available from Brugger Company under 140° C. seal temperature and 300N pressure for 1 second, then cooled down and cut into 15 mm width strips for heat seal strength test under 250 mm/min crosshead speed using a 5940 Series Single Column Table Top System available from Instron Corporation. Three strips for each sample were tested and the average value was calculated. Results were in the unit of N/15 mm.

5. Performance Evaluation Results

The Bond Strength (BS) and Heat Seal Strength (HS) properties were summarized in Table 3. The results showed that the use of SMA-3000H would improve the bond strength and heat seal strength of PET/PE and Foil/PE. However, when the content of SMA-3000H was increased to 5.08% by dry weight, the bond strength of PET/PE and Foil/PE started to decrease. When the content of SMA-3000H was further increased to 6.67%, the bond strength even became lower than the original ROBOND™L-80D's performance.

TABLE 3

| | | BS-(N/15 MM) | | HS-N/15 MM | |
|---|---|---|---|---|---|
| | | PET/PE | Foil/PE | PET/PE | Foil/PE |
| C-1 | ROBOND ™L-80D | 1.21 | 1.86 | 18.23 | 16.4 |
| I-1 | SMA-1 | 1.39 | 1.94 | 23.81 | 19.6 |
| I-2 | SMA-2 | 2.05 | 3.2 | 27.31 | 24.2 |
| I-3 | SMA-3 | 2.21 | 3.43 | 32.23 | 25.34 |
| I-4 | SMA-4 | 2.08 | 2.54 | 30.21 | 23.42 |
| C-2 | SMA-5 | 1.08 | 1.72 | 28.89 | 22.11 |

The invention claimed is:

1. An adhesive composition, comprising:
(A) an acrylic emulsion polymer consisting of
(i) structural units of a vinyl aromatic monomer,
(ii) structural units of a (meth)acrylate monomer selected from the group consisting of methyl acrylate, butyl methacrylate, butyl acrylate, and combinations thereof, and
(iii) structural units of a (meth)acrylic acid; and
(B) a vinyl aromatic monomer-maleic anhydride copolymer,
wherein (B) vinyl aromatic monomer-maleic anhydride copolymer is present at an amount of 0.1% by weight to 6.5% by weight, based on the total solid weight of the adhesive composition.

2. The adhesive composition of claim 1, wherein the acrylic emulsion polymer consists of, by weight based on the weight of the emulsion polymer,
(i) from 30% to 50% of structural units of the vinyl aromatic monomer,
(ii) from 50-70% of structural units of the (meth)acrylate monomer, and
(iii) from 0.1% to 8% of structural units of the (meth) acrylic acid.

3. The adhesive composition of claim 2, wherein the acrylic emulsion polymer consists of, by weight based on the weight of the emulsion polymer,
(i) from 30% to 50% of structural units of the vinyl aromatic monomer that is styrene,
(ii) from 50-70% of structural units of the (meth)acrylate monomer that is butyl acrylate, and
(iii) from 0.1% to 8% of structural units of the (meth) acrylic acid that is acrylic acid.

4. The adhesive composition of claim 1, wherein the vinyl aromatic monomer-maleic anhydride copolymer comprises (a) structural units of one or more vinyl aromatic monomers and (b) structural units of maleic anhydride.

5. The adhesive composition of claim 1, wherein the vinyl aromatic monomer-maleic anhydride copolymer (B) is present at an amount of 0.5% by weight or more, and at the same time 6.0% by weight or less based on the total solid weight of the adhesive composition.

6. The adhesive composition according to claim 1, wherein the adhesive composition is a one-component water based adhesive composition.

7. A method of producing a laminate using the described adhesive composition, comprising:
(a) providing the adhesive composition of claim 1;
(b) applying the adhesive composition on a first portion of a surface of a substrate to form a layer of the adhesive composition;
(d) bringing a second portion of a surface of a substrate into contact with the layer of the adhesive composition, so that the layer of the adhesive composition is sandwiched between the first portion and the second portion; and
(e) drying the adhesive composition or allowing it to dry.

8. A laminate prepared by using the method of producing a laminate of claim 7.

9. A laminate comprising a first portion of a surface of a substrate, a layer of an adhesive composition of claim 1, and a second portion of a surface of the same or a different substrate, wherein the layer of the adhesive composition is sandwiched between and in contact with the first portion and the second portion.

* * * * *